Nov. 4, 1924.  
L. BROWN  
1,514,501  
MOTION PICTURE MECHANISM  
Filed May 13, 1920  
4 Sheets-Sheet 3
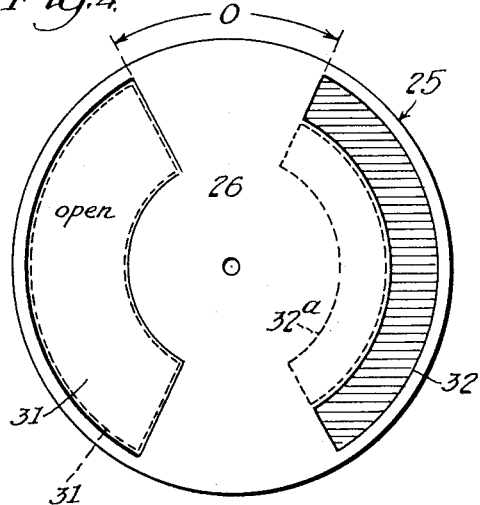
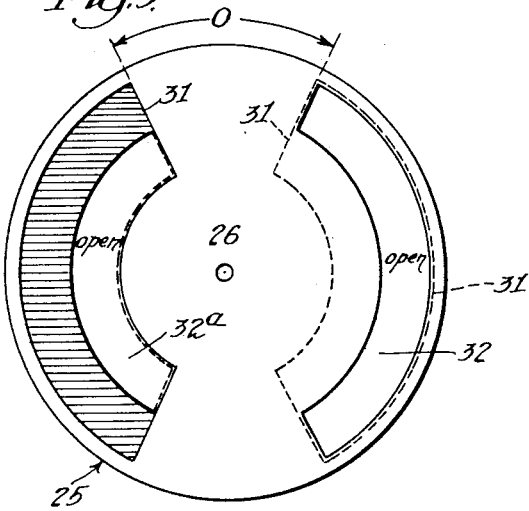
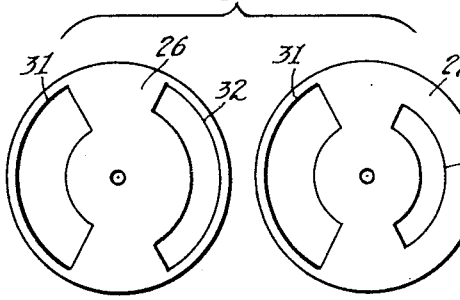
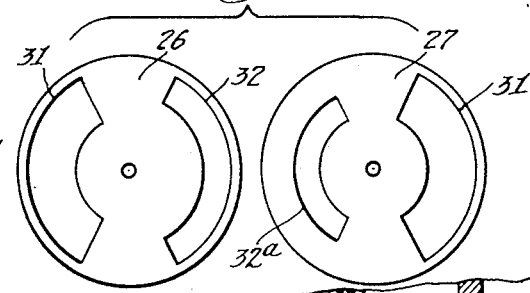
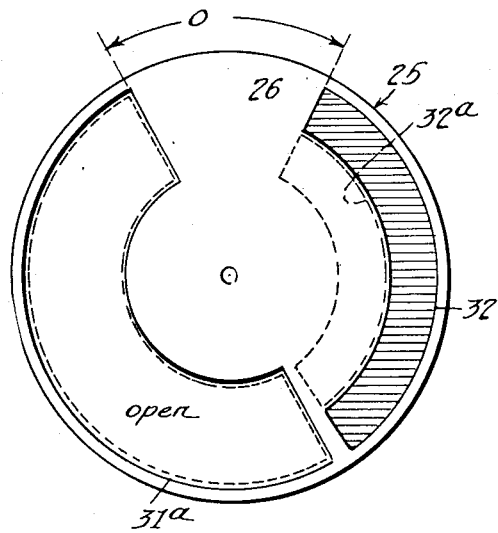
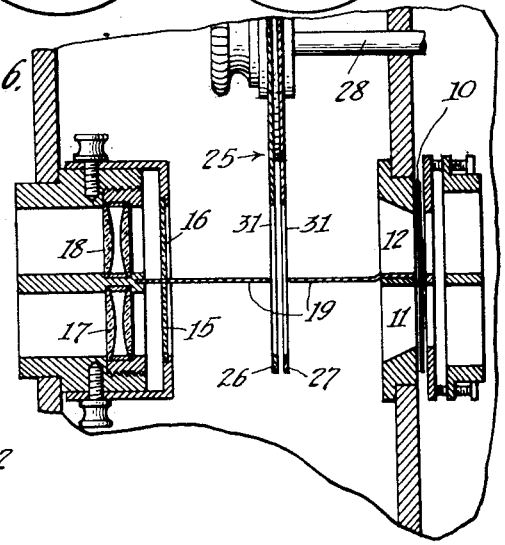
Inventor:  
Lloyd Brown  
by  
his Attorney

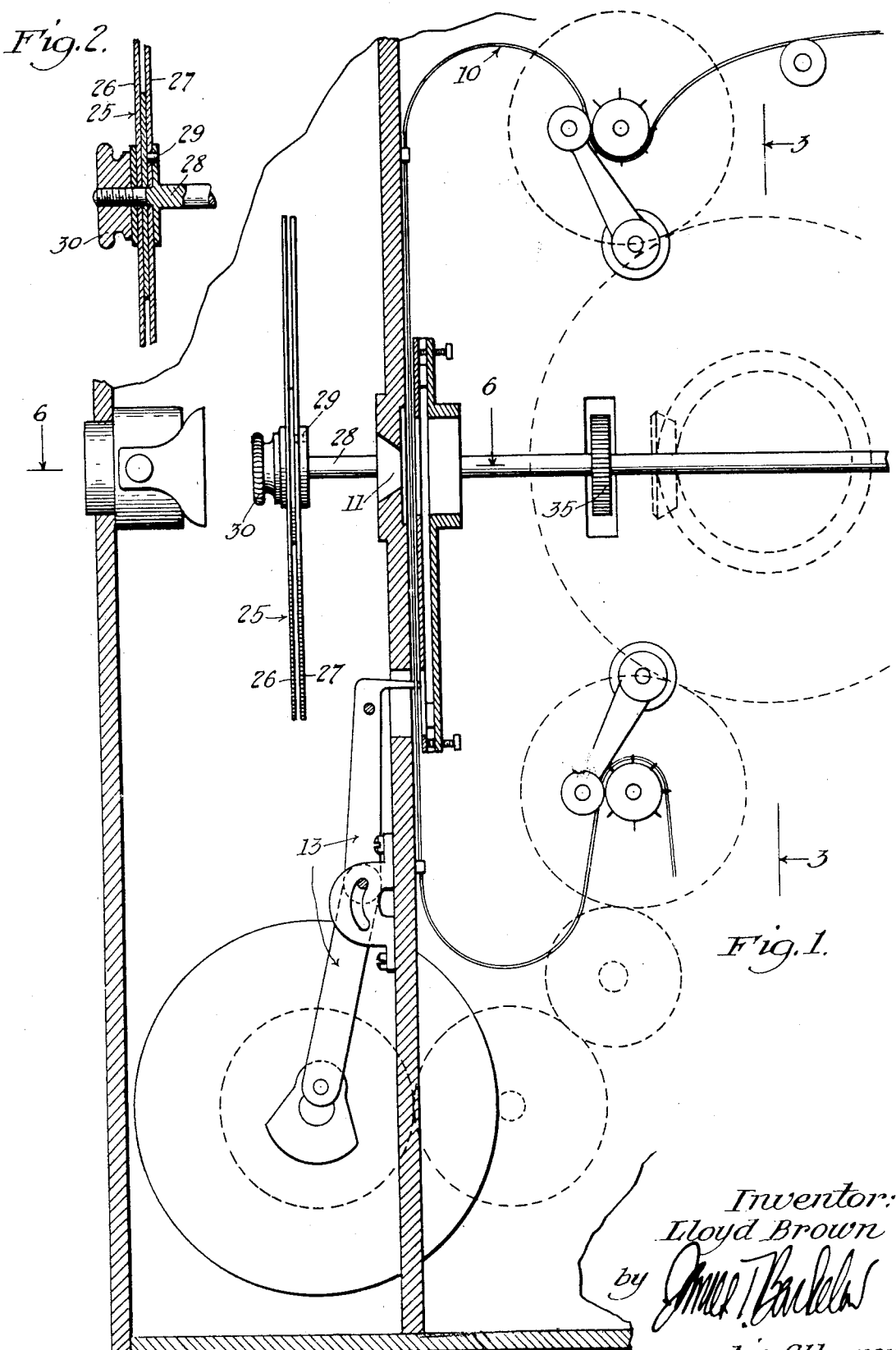

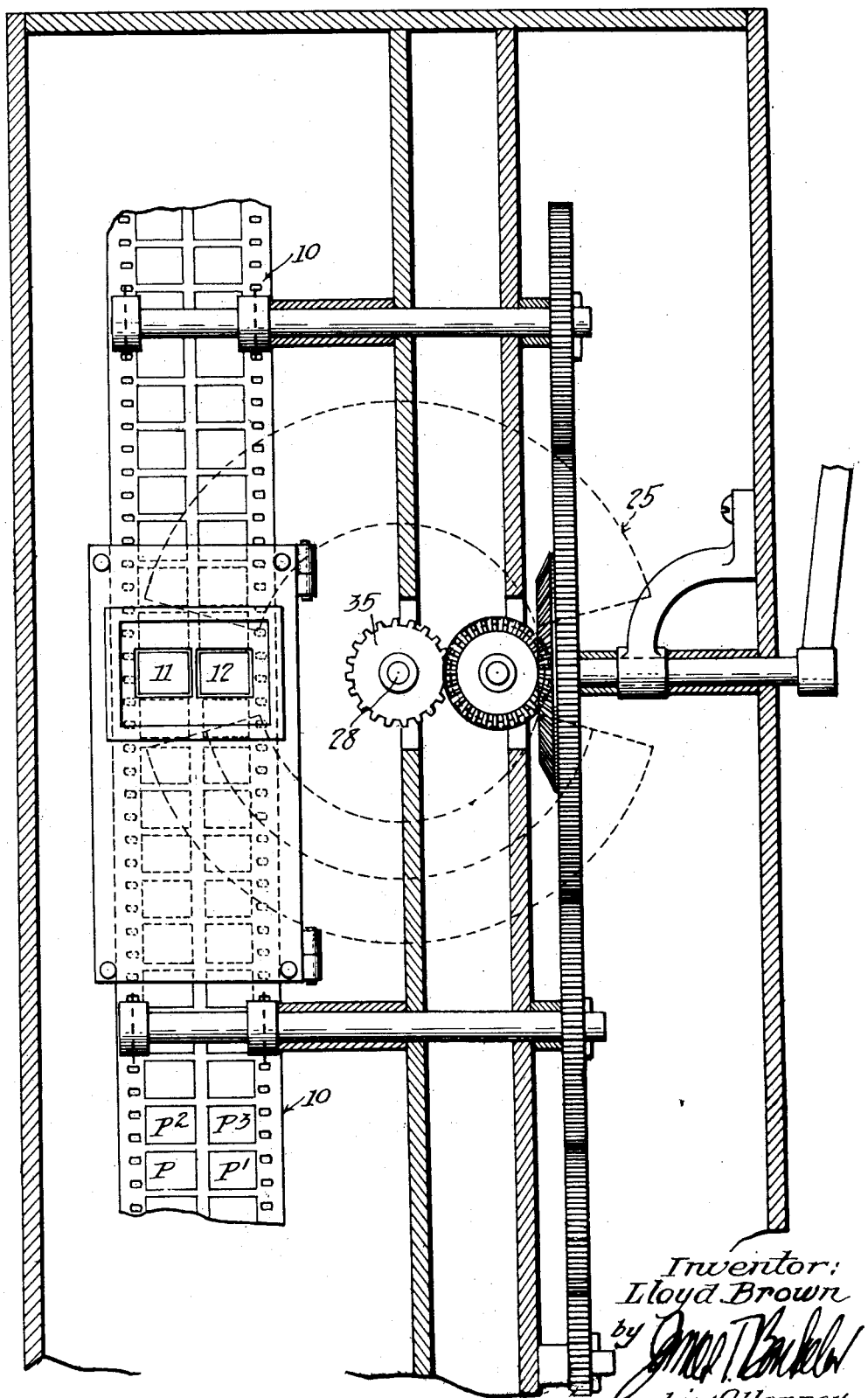

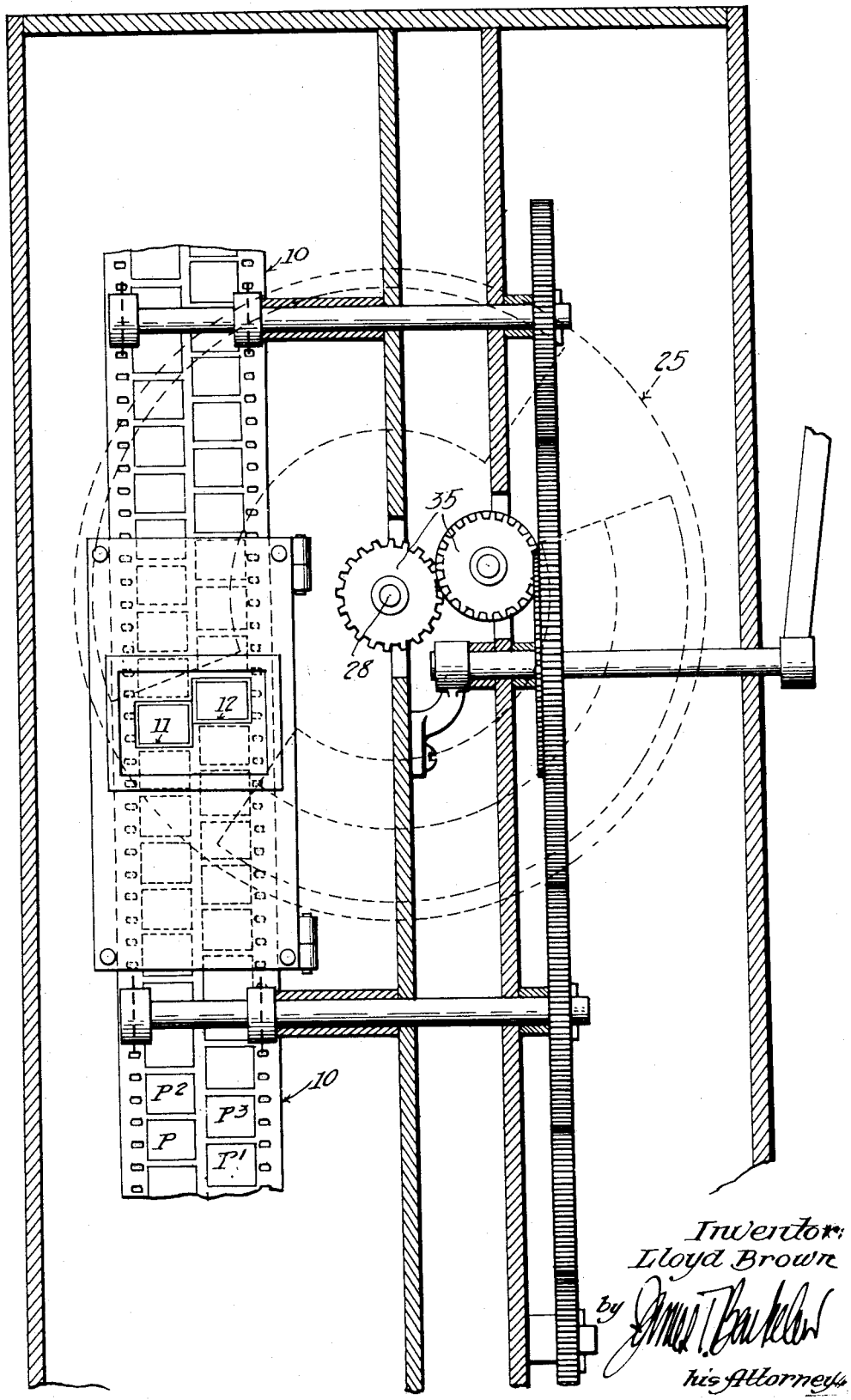

Patented Nov. 4, 1924.

1,514,501

UNITED STATES PATENT OFFICE.

LLOYD BROWN, OF LOS ANGELES, CALIFORNIA, ASSIGNOR, BY MESNE ASSIGNMENTS, TO C. B. HURTT, W. F. PETERSON, GEORGE BAYNE STEPHENS, AND CATHERINE BAYNE STEPHENS, ALL OF LOS ANGELES, CALIFORNIA, AND G. A. STEPHENS, OF MOLINE, ILLINOIS, TRUSTEES.

MOTION-PICTURE MECHANISM.

Application filed May 13, 1920. Serial No. 381,088.

*To all whom it may concern:*

Be it known that I, LLOYD BROWN, a citizen of the United States, residing at Los Angeles, in the county of Los Angeles, State of California, have invented new and useful Improvements in Motion-Picture Mechanism, of which the following is a specification.

This invention relates to motion picture mechanism in general, either of the camera or the projector type; and there are several important objects of the invention. All the objects of the invention, and the corresponding features and accomplishments of mechanism embodying the invention may be readily understood from a description of the invention embodied in a camera mechanism; and so, for the purpose of giving a clear and intelligent understanding of my invention, I explain the same as embodied in a camera mechanism, without limiting myself at all to such specific embodiment.

It is a general object of this invention to provide an effective system for the taking and projecting of color pictures; also for the taking and projecting of pictures in black and white; to economize on length of film; to provide mechanism accomplishing all of these objects in a single combination; and to provide a mechanism which may be readily changed over from color to black and white and vice-versa. There are many other objects, and corresponding accomplishments, of the invention; and these will be best understood from the following detailed description of a camera mechanism embodying the invention; reference for this purpose being had to the accompanying drawing in which—

Fig. 1 is a vertical longitudinal section of a camera mechanism embodying the invention; Fig. 2 is a detailed section showing the shutter construction; Fig. 3 is a vertical transverse section and elevation of the parts shown in Fig. 1; Fig. 3 being taken as indicated by line 3—3 on Fig. 1. Fig. 4 is a face view of the shutter in one position of its adjustment, this view being reduced in size; Fig. 4ª is a smaller view showing diagrammatically the two parts of the shutter in their relative positions for the arrangement shown in Fig. 4; Fig. 5 is a view similar to Fig. 4 showing the shutter in another arrangement, for black and white work; Fig. 5ª is a view similar to Fig. 4ª, showing the shutter parts in their positions of Fig. 5; Fig. 6 is a horizontal section on line 6—6 of Fig. 1; Fig. 7 is a view similar to Fig. 4 showing a modified form of shutter; and Fig. 8 is a view similar to Fig. 3 showing a modified arrangement of mechanism.

In the drawings I show a film 10 on which exposures are made through double apertures 11 and 12, these apertures being of approximately half the ordinary width and half the ordinary height; so that in the space on the film ordinarily occupied by a single picture, I take four pictures. The film 10 is advanced by any suitable film advancing mechanism, such for instance, as illustrated at 13, and the distance of advancement upon each film moving operation of this mechanism is the width (the dimension measured lengthwise of the film) of a single picture; which is a distance corresponding to twice the distance between sprocket holes in the standard film. In other words, in my mechanism, the film is intermittently moved through a distance sufficient to bring successive pairs of pictures to register with apertures 11 and 12. These pairs of pictures $P—P^1$, $P^2—P^3$, etc., are arranged preferably opposite each other transversely across the film; although it will readily be seen that it is not necessary that the pictures of each pair be arranged on a line extending at right angles across the film. In Figs. 1 and 3 I have shown the pictures so arranged, and have correspondingly shown the apertures 11 and 12 so arranged. But the individual pictures may be arranged on the film in any other paired relation, and the apertures arranged correspondingly. For instance, in Fig. 8 I show the pictures in staggered arrangement and the apertures correspondingly placed. The form of this film is the same as that in my application Serial No. 267,046 filed December 16th, 1918. It will thus be seen that the present mechanism may be modified to handle the film of that application or a film wherein the individual pictures are in any other arrangement. In the arrangement shown in Fig. 8, a projector according to the present invention can project a picture taken in a camera such as shown in the application just mentioned. And a camera according to Fig. 8 will take the same kind of pictures (in black and white) that the camera of said former application takes.

Opposite the two apertures 11 and 12, there are two lenses 17 and 18, respectively; and behind these two lenses, for the purpose of taking color pictures, there are color screens 15 and 16, respectively. Between the two lenses, and extending to the apertures, there is a division 19 to prevent interference between the two independent lenses and aperture systems.

The shutter is shown at 25. In its present preferred form it embodies two disks 26 and 27 mounted upon a shutter shaft 28. The rear disk 27 may be so mounted upon a shaft (as by engaging a pin 29) so as to always be in a certain position on the shaft, and therefore always be in a certain set relation to the other parts of the mechanism. The other disk 26 is adjustable in position, and a thumb-nut 30, or any other suitable or equivalent means may be used to set it.

Figs. 4 and 4ª show the shutter disks in their proper position for taking or projecting color pictures. Each of the disks 26 and 27 has a large opening 31. These two openings are of equal size and are adapted to be fully registered with each other. (In Figs. 4 and 5 the openings are shown as of slightly different dimensions in order to illustrate diagramatically their positions.) Each shutter disk 26 and 27 also has a smaller opening adapted to partially register with the large opening in the other shutter disk. For instance, disk 26 has an opening 32 which is of about the same circumferential extent as its opening 31, but is only one-half, or approximately one-half, the radial dimension of opening 31; so that opening 32 may be made to register with the outer part of opening 31 in the other disk. Correspondingly, shutter disk 27 has a small opening 32ª of circumferential, or angular, extent, equal to the extent of aperture 32, and similar to the aperture 32 in all respects except that it is adapted to register with the inner part of the opening 31 in shutter disk 26. It will now be apparent that when the two disks are in the relative positions shown in Figs. 4 and 4ª, then a composite shutter will be formed having a single large opening; while when the two shutter disks are in the relative positions shown in Figs. 5 and 5ª, then a composite shutter will be formed having two opposite openings, one of which openings is closer to the center of rotation than the other. The shutter blades in Fig. 4 are so placed relative to the two apertures that the single large opening will simultaneously uncover both apertures; while the two small openings of the shutter (in the arrangement shown in Fig. 5) will alternately uncover first one and then the other of the two apertures 11 and 12.

The shutter is connected into the general camera mechanism by suitable gears as indicated at 35; and the gearing ratio is such that the shutter makes one revolution for each film moving operation of the mechanism 13. The parts are so timed that the film moving operation takes place during the time that one of the opaque parts of the shutter is crossing the aperture. Thus for instance, a movement of the film may be considered as taking place during the period in which the sector designated O in Figs. 4 and 5, is passing the apertures. It will be noted that the shutter is so constructed that two occultations take place for each shutter revolution; but the movement of the film takes place during only one of these occultations. This occultation sector of the shutter need therefore be only preserved between one set of adjacent ends of the two apertures in each disk. At the other end of the large aperture that aperture may, if desired, be extended on around close to the adjacent end of the smaller apertures. Such an arrangement is illustrated in Fig. 7 where the large apertures 31ª are shown as being somewhat longer in extent. Such an arrangement as this may be used where it is desired to obtain a relatively longer exposure when exposing color pictures in order to increase the time of exposure in the camera or to increase the time of projection in a projector and thus increase the average intensity of illumination on the screen.

In my improved mechanism, when it is desired to take or project color pictures, the shutter is put into the position shown in Fig. 4, and the camera is operated at the rate of sixteen intermittent movements per second, with the color filters in place. Pictures of each pair are exposed simultaneously, and thus, in a camera, pictures are taken of exactly the same action on each of a pair of pictures; while in a projector simultaneous projection in two colors is effected, the color blending taking place directly upon the screen without the necessity of the two colors being blended by the action of retinal persistence. Consequently, the objectionable color flicker is done away with. And it is to be noted that, running at the rate of sixteen movements per second, only one-half the usual length of film is used. And only one-quarter as much film is used as where ordinary color pictures are taken or projected at a rate of thirty-two per second. The improvement here is not only in reduction of film length, but also is in being able to get color pictures with only sixteen movements per second. The higher rate of movement destroys the intermittent mechanism, particularly in projectors.

When it is desired to take or project pictures in black and white, the shutter is put into the position shown in Fig. 5 and the camera is then run only at the rate of eight intermittent movements per second; without the color filters. In this position of the shutter, it is to be noted that, after an intermittent movement of the film, first one aperture will be uncovered by one of the shutter openings, and then the other aperture will be uncovered by the other shutter opening; and then the next intermittent movement will take place. Thus, in the period immediately following each successive intermittent movement, the two apertures will be successively uncovered. By this arrangement of mechanism, I attain the objects and results of greatly cutting down the amount of film used for black and white pictures, without the necessity of a complicated mechanism; I attain all the benefits derived from a film having two or more rows of pictures, or pictures in arrangement of sets of two or more, with the use of a very simple mechanism, involving a minimum of moving parts. The film length is cut to one-quarter that of standard film; and the intermittent mechanism operates only half as many times per second, reducing wear and tear to a great extent. This feature of my invention I consider one of value in itself, as well as in its combination or association with the features which make the mechanism capable not only of this action, but also of the color picture action, as before described.

The original negative film may be exposed in a camera of the kind described, either using color filters in the ordinarily known manner; or the film itself may be pretreated in such a manner as to make the two halves, the two parts separated by a longitudinal central line, susceptible selectively to red light and green light. In other words, any of the ordinarily known methods may be used to produce images of the two complementary colors upon the two pictures. Conversely, the projection of the pictures may take place through similar color filters; or the two parts of the projection positive may be dyed or stained in the two colors; or the two colors may be applied to the final projection positive in any suitable manner.

The two lenses 17 and 18 may be arranged so as to be capable of focusing at any given distance, so as to focus upon an object when the pictures are being taken, and so as to superimpose accurately the two projections upon a screen. Such arrangement may also be made in any suitable manner; it is not necessary for the purposes of this invention to explain specifically how that may be done.

While I have explained fully and in detail the specific features of the camera arrangement embodying my invention, it will be fully understood that I have done so not for the purpose of limiting my invention to the particular details and features herein set forth, but for the purpose of making my invention clear and intelligible by a full and detailed explanation of its application to one particular kind of mechanism.

Having described a preferred form of my invention, I claim:

1. In motion picture mechanism, the combination of a structure having a plurality of apertures, means for advancing a film, and a shutter adapted either to uncover more than one of the apertures simultaneously or to uncover several of the apertures alternately.

2. In motion picture mechanism, the combination of a structure having two apertures, means for advancing a film, and a shutter adapted either to uncover both apertures simultaneously or to uncover the two apertures alternately.

3. In motion picture mechanism, the combination of a structure having a plurality of apertures, arranged in a line, means for advancing a film transversely of the line of the apertures in intermittent movements substantially equal to the dimension of the apertures transverse to their line, and a shutter adapted either to uncover more than one of the apertures simultaneously or to uncover several of the apertures alternately.

4. In motion picture mechanism the combination of a structure having a plurality of apertures arranged in a line, means for advancing a film transversely of the line of the apertures in intermittent movement substantially equal to the dimension of the apertures transverse to their line, and a shutter adapted either to uncover more than one of the apertures simultaneously after each successive film movement or to uncover several of the apertures one after the other after each successive film movement.

5. In motion picture mechanism the combination of a structure having a plurality of apertures arranged in a line, means for advancing a film transversely of the line of the apertures in intermittent movement, and a shutter adapted either to uncover more than one of the apertures simultaneously after each successive film movement or to uncover several of the apertures one after the other after each successive film movement.

6. In motion picture mechanism, the combination of a structure having two apertures in a transverse line, means for advancing a film longitudinally in intermittent movements substantially equal to the longitudinal dimension of the apertures, and a shutter adapted either to uncover both the apertures simultaneously or to uncover the two apertures alternately.

7. In motion picture mechanism, the combination of a structure having two apertures and lenses arranged in a transverse line, means for advancing a film longitudinally in intermittent movements substantially equal to the longitudinal dimension of the aperture, and a shutter adapted either to uncover both the apertures simultaneously after each successive film movement or to uncover the two apertures one after the other after each successive film movement.

8. In a motion picture mechanism, the combination of a structure having a plurality of apertures, means to advance a film intermittently past the apertures, and means adapted either to uncover several apertures simultaneously during the interval following each successive film movement or to uncover several of the apertures successively during each said interval.

9. In a motion picture mechanism, the combination of a structure having a plurality of apertures, means to advance a film intermittently past the apertures, and means adapted either to uncover several apertures simultaneously during the interval following each successive film movement or to uncover several of the apertures successively during each said interval; said means embodying a shutter device connected with the film advancing means to make one revolution for each film movement, said device comprising two relatively adjustable members having registrable openings in one part and each having in another part an opening adapted to partially register with the first mentioned opening in the other.

10. In motion picture mechanism the combination of a structure having a plurality of apertures arranged in a line, means for advancing a film transversely of the line of the apertures and lenses in intermittent movement substantially equal to the dimension of the apertures transverse to their line, and means adapted either to uncover more than one of the apertures simultaneously after each successive film movement or to uncover several of the apertures one after the other after each successive film movement; said means embodying a shutter device connected with the film advancing means to make one revolution for each film movement, said device comprising two relatively adjustable members having registrable openings in one part and each having in another part an opening adapted to partially register with the first mentioned opening in the other.

11. In motion picture mechanism, a shutter device comprising two relatively adjustable members having registrable openings in one part and each having in another part an opening adapted to partially register with the first mentioned opening in the other.

12. In motion picture mechanism, a shutter device comprising two relatively adjustable members having registrable openings in one part and each having in another part an opening adapted to partially register with the first mentioned opening in the other, said partially registering openings in the two parts being non-registrable with each other.

13. In motion picture mechanism, a shutter device embodying two relatively adjustable members both having at one side thereof registrable openings, and one having at its opposite side an opening adapted to register with the outer portion only of the first mentioned opening in the other part, and the other part having at its opposite side an opening adapted to register with the inner portion only of the first mentioned opening in the first mentioned part.

LLOYD BROWN.